US008331975B2

United States Patent
Lin et al.

(10) Patent No.: US 8,331,975 B2
(45) Date of Patent: Dec. 11, 2012

(54) UPLINK POWER CONTROL FOR DISTRIBUTED WIRELESS COMMUNICATION

(75) Inventors: Zinan Lin, Melville, NY (US);
Alexander Reznik, Titusville, NJ (US);
Prabhakar R. Chitrapu, Blue Bell, PA (US); Mihaela C. Beluri, Huntington, NY (US); Eldad M. Zeira, Huntington, NY (US); Philip J. Pietraski, Huntington Station, NY (US); Sung-Hyuk Shin, Northvale, NJ (US); Gregg A. Charlton, Collegeville, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 470 days.

(21) Appl. No.: 12/627,376

(22) Filed: Nov. 30, 2009

(65) Prior Publication Data
US 2010/0137017 A1 Jun. 3, 2010

Related U.S. Application Data

(60) Provisional application No. 61/119,637, filed on Dec. 3, 2008.

(51) Int. Cl.
*H04B 7/00* (2006.01)
*H04B 1/00* (2006.01)
*H04Q 11/12* (2006.01)

(52) U.S. Cl. ........ 455/522; 455/69; 455/524; 455/127.1

(58) Field of Classification Search ............... 455/11.1, 455/7, 9, 16, 522, 69, 524, 127.1
See application file for complete search history.

(56) References Cited

U.S. PATENT DOCUMENTS

| 5,485,486 | A | 1/1996 | Gilhousen et al. |
| 6,785,510 | B2 * | 8/2004 | Larsen ........................ 455/11.1 |
| 6,850,500 | B2 * | 2/2005 | Zeira et al. .................... 370/328 |
| 7,233,771 | B2 * | 6/2007 | Proctor et al. ............... 455/11.1 |
| 7,933,549 | B2 * | 4/2011 | Larsson ........................... 455/7 |
| 2008/0090575 | A1 * | 4/2008 | Barak et al. ..................... 455/444 |
| 2008/0220806 | A1 * | 9/2008 | Shin et al. ...................... 455/522 |
| 2008/0227461 | A1 * | 9/2008 | Dayal et al. ................ 455/452.2 |

FOREIGN PATENT DOCUMENTS
EP 1 592 147 11/2005
WO 2006/137005 12/2006

OTHER PUBLICATIONS

Hamiti, "The Draft IEEE 802.16m System Description Document," IEEE 802.16 Broadband Wireless Access Working Group, IEEE 802.16m-08/003r5 (Oct. 3, 2008).

(Continued)

*Primary Examiner* — Tilahun B Gesesse
(74) *Attorney, Agent, or Firm* — Volpe and Koenig, P.C.

(57) ABSTRACT

A method and apparatus for power control for distributed wireless communication is disclosed including one or more power control loops associated with a wireless transmit/receive unit (WTRU). Each power control loop may include open loop power control or closed loop power control. A multi-phase power control method is also disclosed with each phase representing a different time interval and a WTRU sends transmissions at different power levels to different set of node-Bs or relay stations during different phases to optimize communications.

16 Claims, 11 Drawing Sheets

OTHER PUBLICATIONS

Third Generation Partnership Project, "Technical Specification Group Radio Access Network; Evolved Universal Terrestrial Radio Access (E-UTRA); Physical layer procedures (Release 8)," 3GPP TS 36.213 V8.8.0 (Sep. 2009).

Third Generation Partnership Project, "Technical Specification Group Radio Access Network; Evolved Universal Terrestrial Radio Access (E-UTRA); Physical layer procedures (Release 8)," 3GPP TS 36.213 V8.4.0 (Sep. 2008).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.7.0 (May 2009).

Third Generation Partnership Project, "Technical Specification Group Radio Access Network; Evolved Universal Terrestrial Radio Access (E-UTRA); Multiplexing and channel coding (Release 8)," 3GPP TS 36.212 V8.4.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.6.0 (Sep. 2008).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.10.0 (Sep. 2009).

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.1.0 (Sep. 2009).

* cited by examiner

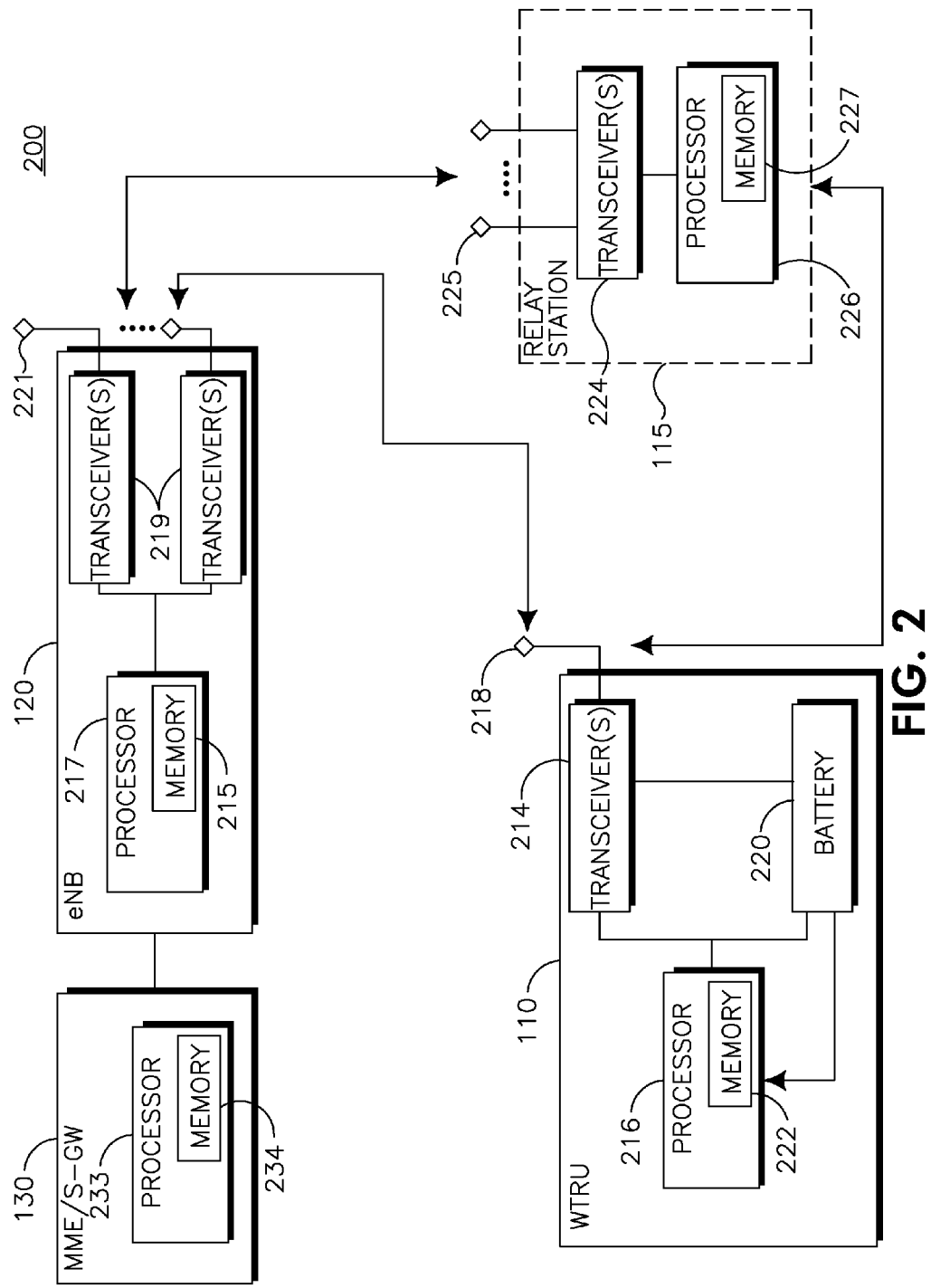

PHASE 1

PHASE 2

PHASE 1

PHASE 2

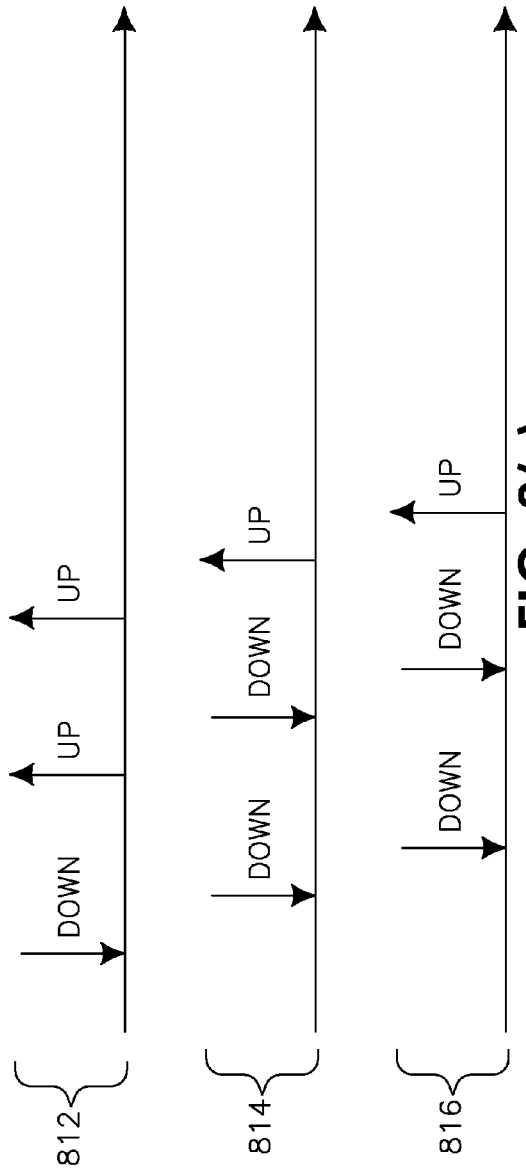
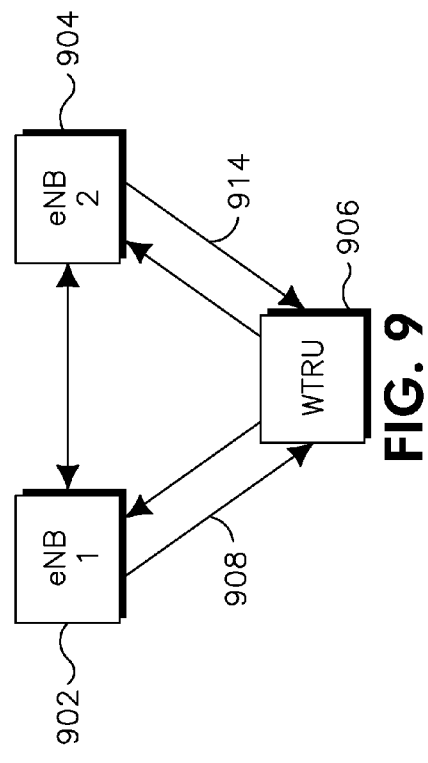

UPLINK POWER CONTROL FOR DISTRIBUTED WIRELESS COMMUNICATION

CROSS REFERENCE TO RELATED APPLICATION

This application claims the benefit of U.S. Provisional Application Ser. No. 61/119,637 filed on Dec. 3, 2008, which is incorporated by reference as if fully set forth herein.

FIELD OF INVENTION

This application is related to wireless communications.

BACKGROUND

In orthogonal frequency division multiplexing (OFDM), single-carrier frequency-division multiple access (SC-FDMA), Long Term Evolution (LTE), 802.16, code division multiple access (CDMA), or other wireless network technologies transmissions from different cells may share the same uplink (UL) resources. In a single cell, different data streams that belong to the same wireless transmit/receive unit (WTRU) or different WTRUs may share the same resources. Because of resource sharing, it may be desirable to adjust the WTRU's total transmission power in order to achieve a desired quality of service (QoS), acceptable intra-cell and inter-cell interference level, improved cell-edge performance, extended cell coverage, or the like. Precise power control may also be desirable in systems using multi-user multiple in/multiple out (MU-MIMO) transmissions.

Many wireless networks support open loop and closed loop power control schemes. Open loop power control may be performed to fully or partially compensate for short-term and/or long-term channel variations that are determined in the WTRU based on downlink channel estimations, channel state information, channel noise modeling, or the like. For closed loop power control, a power control command provided by a base station is signaled to the WTRU for correcting errors occurring in the open loop power control. The correction of the transmit power in the closed loop may be either accumulated or absolute.

LTE, 802.16, MIMO, or CDMA based networks may also be setup as distributed communications, systems, or networks where one or more WTRUs communicate concurrently with at least two or more base stations using multiple independent, and sometimes simultaneous, communications. Moreover, distributed communications may include relay stations (RSs). A RS, in general, is a device that relays or repeats communication back and forth between one or more WTRUs and at least one base station. In a distributed communication one or more WTRUs may simultaneously communicate with two or more relay stations and two or more base stations, as desired.

A WTRU may receive a power control command from each RS or base station it communicates with in a distributed network. This creates a problem since the power control commands are uncoordinated and sometimes conflicting with each RS or base station trying to meet it's own signal to interference plus noise ratio (SINR) level causing a less than ideal overall system performance. A need exists in distributed wireless communications for power control to reduce power consumption of a WTRU, mitigate intra-cell and inter-cell interference, and maintain a desired QoS, SINR, or block error rate (BLER).

SUMMARY

A method and apparatus for power control for distributed wireless communication is disclosed comprising one or more power control loops associated with a WTRU. Each power control loop may include open loop power control or closed loop power control. A multi-phase power control method is also disclosed with each phase representing a different time interval and a WTRU sends transmissions at different power levels to different set of node-Bs or relay stations during different phases to optimize communications.

BRIEF DESCRIPTION OF THE DRAWINGS

A more detailed understanding may be had from the following description, given by way of example in conjunction with the accompanying drawings wherein:

FIG. 2 is a functional block diagram of a WTRU, an evolved node-B, and RS of FIG. 1;

FIG. 8(c) shows an example of a response to multiple TPC commands from a eNB and RS;

FIG. 9 shows an example of multi-loop power control in a MIMO based network;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of device capable of operating in a wireless environment. When referred to hereafter, the terminology "base station" includes but is not limited to a node-B, a site controller, an access point (AP), or any other type of interfacing device capable of operating in a wireless environment. In the forthcoming description, even though an evolved node-B (eNB) may be used throughout the present description, it may be configured or adapted to networks having legacy base stations. Moreover, although some of the examples given below are for uplink power control the present description may also be configured or adapted for downlink power control.

Figure 1:
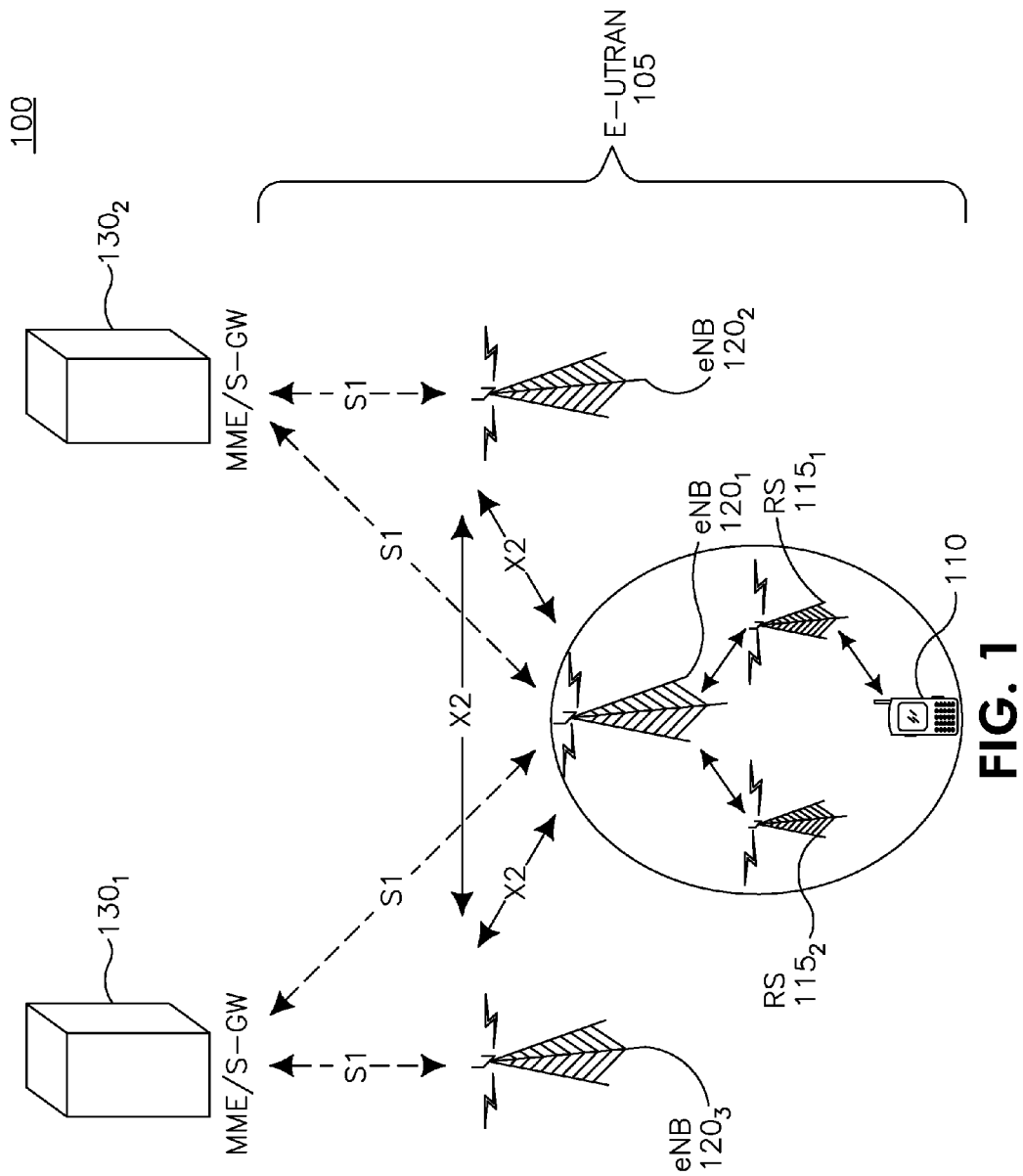
FIG. 1 shows an example wireless communication system including wireless transmit/receive units (WTRUs), evolved node-Bs, gateways, and relay stations (RSs)

FIG. 1 shows a Long Term Evolution (LTE) wireless communication system/access network 100 that includes an Evolved-Universal Terrestrial Radio Access Network (E-UTRAN) 105. The E-UTRAN 105 includes a WTRU 110, at least two relay stations (RSs) $115_1$-$115_2$, and several eNBs $120_1$-$120_3$. WTRU 110 is in communication with one or more eNBs $120_1$-$120_3$ and/or relay stations $115_1$-$115_2$. The eNBs $120_1$-$120_3$ interface with each other using an X2 interface. Each of the eNBs $120_1$-$120_3$ interface with a Mobility Management Entity (MME)/Serving GateWay (S-GW) $130_1$ or $130_2$ through an S1 interface. Although a single WTRU 110 and three eNBs $120_1$-$120_3$ are shown in FIG. 1, it should be apparent that any combination of wireless and wired devices may be included in wireless communication system/access network 100.

FIG. 2 is a block diagram of an LTE wireless communication system 200 including WTRU 110, RS 115, eNB 120, and MME/S-GW 130. As shown in FIG. 2, WTRU 110, RS 115, eNB 120 and MME/S-GW 130 are configured to perform a method of uplink power control for distributed wireless communications. Although FIGS. 1 and 2 are examples of LTE networks, similar networks configured for CDMA, 802.16, or High Speed Packet Access (HSPA) communications is envisioned and applicable to the examples and embodiments described herein.

In addition to the components that may be found in a typical WTRU, WTRU 110 includes a processor 216 with an optional linked memory 222, at least one transceiver 214, an optional battery 220, and an antenna 218. The processor 216 is configured to perform a method of uplink power control for distributed wireless communication. Transceiver 214 is in communication with processor 216 and antenna 218 to facilitate the transmission and reception of wireless communications. In case a battery 220 is used in the WTRU 110, it powers transceiver 214 and processor 216.

In addition to the components that may be found in a typical RS, RS 115 includes a processor 226 with an optional linked memory 227, transceivers 224, and antennas 225. Processor 226 is configured to perform a method of uplink power control for distributed wireless communication. Transceivers 224 are in communication with processor 226 and antennas 225 to facilitate the transmission and reception of wireless communications.

In addition to the components that may be found in a typical eNB, eNB 120 includes a processor 217 with an optional linked memory 215, transceivers 219, and antennas 221. Processor 217 is configured to perform a method of uplink power control for distributed wireless communication. Transceivers 219 are in communication with processor 217 and antennas 221 to facilitate the transmission and reception of wireless communications. The eNB 120 is connected to the Mobility Management Entity/Serving GateWay (MME/S-GW) 130 which includes a processor 233 with an optional linked memory 234.

Still referring to FIG. 2, WTRU 110 and eNB 120 may each be configured to perform multi-phase power control in a distributed MIMO system. Each phase in multi-phase power control may be a time interval where WTRU 110 communicates with eNB 120 or both eNB 120 and RS 115. For example, in a first phase time interval WTRU 110 may communicate with both eNB 120 and RS 115, and to eNB 120 in a second phase time interval. For each phase an independent power control loop, either open or closed loop, may be provided. Although a two phase configuration is given, N RSs 115 may be provided between WTRU 110 and eNB 120 to have a multi-phase power control system of N+1 phases in FIG. 2 and other examples set forth herein. With N+1 phases, each phase may be the same or different time interval.

Moreover, in a distributed communication network power control for WTRU 110 may or may not depend on the specific network topology. However, the delivery of power control commands for closed loop power control, and the forwarding of both types of power control may be dependent on the topology of wireless communication system/access network 100.

A power control loop may be an apparatus or process for setting and adjusting a transmitter's transmit power during the transmission time that may be associated with a particular type of transmission. The setting and adjustment may be based on measurements performed at the transmitter in open loop or eNB/relay station feedback via commands in closed loop, or both. Open loop power control may be used to compensate for long term channel variations due to path loss, shadowing, or the like, between WTRU 110 and eNB 120 or RS 115. Closed loop power control may be used to correct errors from open loop power control, compensate for short-term fading, or mitigate inter-cell-interference.

Since power control loops between a transmitter and receiver may be independent, power control for closed loop may not always be combinable. Rather, each power control loop may operate independently to track and determine its necessary transmit power. At the time of transmission, WTRU 110 may select the power setting as determined by the appropriate power control loop.

WTRU 110 using open loop power control may base its transmission power on a long-term averaged downlink pathloss estimate between itself and eNB 120 and/or RS 115. For closed loop power control WTRU 110 may use a power control command provided by a controlling node such as a RS, an eNB, or joint eNB and RS to correct errors. Types of errors may include measurement errors, power amplification errors, or the like.

Moreover, the transmission of a power control command may identify which power control loop WTRU 110 should be associated with in the network. In a first option, explicit signaling may be used to identify the power control loop. A pre-negotiating of the nature of each power control loop via higher-layer signaling may also be performed. However, this may require additional bandwidth to transmit each power control command comprising of a power control command and a power control loop identifier.

In a second option, implicit signaling based on timing may be used to identify a power control loop. A power control command may be associated with a particular power control loop based on the timing of its transmission. For example, if a power control command may be sent following a fixed amount of time after a particular data transmission, this may allow association of the message with the loop that governed that particular data transmission. This power control command may be provided by a eNB $120_1$ acting as a master controlling node of multiple eNBs $120_2$-$120_3$ or RSs $115_1$-$115_2$ in a particular loop, such as by higher layer signaling or one of the multiple eNBs or RSs after communication with multiple eNBs or RSs. The timing may be implied by the choice of the sub-frame to be associated with eNB 120 or RS 115, which may be referred to as a zone.

In another option for associating a power control command with a power loop, implicit signaling may be based on a terminal identifier (ID), in order to identify a power control loop. In the case where power control loops are identified with unique combination of receiving eNBs $120_1$-$120_3$ or RSs $115_1$-$115_2$, simultaneous transmission of commands by multiple eNBs or RSs may be used to associate the command with a particular power control loop. The eNB 120 or RS 115 may be configured to associate a power control command with a specific control channel or signature. Alternatively, hybrid implicit signaling may be implemented where a combination of the above options may be used to identify a power control loop.

The eNB 120 or RS 115 may also be configured to simultaneously transmit power control commands, or to combine multiple and potentially different power control commands. Alternatively multiple eNBs or RSs may be configured to coordinate power control commands, wherein one combined power control command may be sent to WTRU 110.

For open loop power control, there may be one eNB or RS associated with one loop or multiple eNBs or RSs associated with one loop in a distributed communication network. For the case of multiple eNBs or RSs, an appropriate value to compensate the long-term variation between WTRU 110 and several eNBs or RSs may be desired.

In a distributed communication network, multiple eNBs or RSs may each be configured to jointly decode information after partial individual reception if the signal quality at any one eNB or RS is insufficient to successfully decode an entire transmission. In joint decoding, multiple eNBs or RSs may partially decode a portion of the transmission and then pool or share their partial decoding results to successfully decode the transmission. Moreover, the eNBs or RSs may each transmit a soft power control command indicating a proportion of power needed to fully decode the data it estimates as having received. WTRU 110 may then compute the following composite pathloss estimate (PL):

$$PL = \sum_i \lambda_i PL_i \qquad \text{Equation 1}$$

where $\lambda_i$ represents the proportion of power each eNB or RS needs to decode the data. Variable $\lambda_i$ may also be any value between 0 and 1 predetermined by an eNB or RS controlling node or provided by higher layer. $PL_i$ denotes the downlink measurement, i.e., long-term variation, between WTRU 110 and each eNB or RS.

When $\lambda_i=1/K$, where K is the number of eNBs or RSs associated with the particular hop, WTRU 110 may compute an averaged long term loss based on the downlink measurements between itself and several eNBs or RSs.

Alternatively, the composite pathloss estimate PL may be the median of $PL_i$, where the median of pathloss measurements from multiple points measures the middle value of the PL measurement distribution. In another option, open loop power control may rely on a downlink path loss measurement between WTRU 110 and a reference, primary, or serving eNB or RS having the smallest pathloss estimate.

Again referring to closed loop power control, WTRU 110 may receive multiple power control commands for one power control loop and produce a decision regarding the transmit power. Any power changes may apply to some directly controlled channel, such as the dedicated physical control channel (DPCCH) in the uplink for HSPA.

Moreover, power of other channels may be set based on grants, signaled offsets, or the like. One possibility, as employed on soft-handover situations, may be to increase power if most of the commands request a power increase. This may often be "softened" by including reliability information about the quality of reception of each command so that errors are reduced. Such an approach may apply in soft handover where a power down command from any station means that at least one eNBs or RSs may be receiving the data adequately well, and the overall power should be reduced to limit interference.

Because distributed communication systems may perform a partial independent reception followed by coordinated reception, a softer approach to power control may be desired. For example, each eNB or RS may send a soft power control command to WTRU 110 that may indicate what proportion of power may be needed to fully decode the data it estimates as having received. The power control command may also double as a type of a soft acknowledge indicator. WTRU 110 may be configured to combine the soft power control commands and adjust its power to assure that sufficient, or strong, power is transmitted such that the coordinating nodes together may receive the full power, but that the total power does not exceed the minimum necessary amount by more than a pre-defined delta.

In one embodiment of the foregoing application variable $p_i$ may be the power control indicator for the $i^{th}$ power control loop, where $p_i$ may be a quantized soft value in the range 0 to 1. WTRU 110 may be configured to compute total power $$p_T = \sum_i p_i.$$

WTRU 110 may then power up if $p_T<1$, power down if $p_T>1+\Delta$, or make no power changes.

A primary transmit power control (TPC) command may be sent from a primary or master eNB or RS that collects the quality of reception from all the coordinating eNBs or RSs to determine whether the transmit power needs to be increased or decreased. For this case, it is assumed that the coordinating RSs share their reception quality with the primary node. The primary or master eNB or RS may be the same node that WTRU 110 uses for a downlink reference pathloss measurement for an open loop operation.

Referring again to FIG. 2, in the case that RS assistance is necessary different uplink scenarios of WTRU 110 may occur in a RS enhanced cell. In a direct communication configuration, sometimes referred to as a one-hop configuration, the WTRU 110 to eNB 120 link is good and there is no need for the assistance from a RS 115. For this case, the WTRU 110 transmit power is controlled by the TPC issued by eNB 120. WTRU 110 is connected to eNB 120 and power control may be open loop or closed loop. WTRU 110 may compensate for the long-term channel variations between eNB 120 and WTRU 110 and adjust transmission power whenever a TPC message is provided from eNB 120.

In a simple forwarding configuration, the direct link between WTRU 110 and eNB 120 may be poor and cannot sustain direct communications. In this case the WTRU 110 is connected to RS 115. In the one RS TPC at WTRU case, the link between WTRU 110 and one RS 115 is better than other connected links, and the RS 115 may be referred to as the Primary RS (PRS). Any other connected RSs to the WTRU 110 are secondary RSs. WTRU 110 transmit power may be controlled by the TPC commands issued by the PRS in multiple relay cases or one RS in a single relay case. For the multiple RSs TPC at the WTRU case, multiple relays have equally good channel qualities to WTRU 110, the WTRU transmit power may be controlled jointly by multiple RSs.

In a triangle communication configuration, the direct link between WTRU 110 and eNB 120 is present, but insufficient to achieve optimal communications such that the RS's help may be needed. The triangle communication, denoting a communication path from WTRU to RS to WTRU, may lead to different distributed communication relaying schemes, such as multicast forwarding relaying, simple cooperative relaying, multicast cooperative relaying, or the like.

In an opportunistic cooperation configuration with a primary RS (PRS), the PRS has a sufficient connection to WTRU 110 and the links between WTRU 110 and other secondary RSs or eNBs are weak. For this case the primary connection between the WTRU 110 and an eNB is via the PRS, with the connection between WTRU 110 and the other secondary RSs or eNBs providing opportunistic assistance to the primary communication path. In this configuration, the WTRU to PRS and PRS to eNB links may be treated as the primary links with the WTRU to eNB or WTRU to secondary RS links providing opportunistic assistance to the communication along the primary links. As such, WTRU 110 transmit power may be controlled by the TPC messages issued by the PRS, which is referred to as one RS TPC at WTRU.

In an opportunistic cooperation configuration with multiple RSs, the links between WTRU 110 to multiple RSs may be equally better than the link between WTRU 110 and an eNB. WTRU 110 transmit power may be controlled jointly by the TPC commands issued by multiple RS's, which may be referred to multiple RSs TPC at WTRU.

In a strong cooperation configuration, the direct link between WTRU 110 and eNB 120 may be reasonable although insufficient to sustain direct communication and WTRU 110 may communicate with eNB 120 using parallel communication paths, namely the direct WTRU to eNB path as well as WTRU to RS to BS path via RS 115. In this configuration, there is no distinction among various links as they are all treated equally. As such, WTRU 110 transmit power may be controlled jointly by the TPC commands issued by RS 115 as well as eNB 120, also referred to as joint RS & BS TPC at the WTRU.

In FIG. 2, when RS 115 is present the uplink communication between WTRU 110 and eNB 120 may occur in M phases. For instance, when M=2 different scenarios may exist. During phase 1, RS 115 may receive transmissions from WTRU 110. When multicast is not enabled, (e.g, simple forwarding relaying, cooperative delaying and etc.), eNB 120 does not receive any signals directly from WTRU 110 during phase 1. For the case that multicast is enabled, (e.g., multicast forwarding, multicast cooperative relaying and etc.), eNB 120 may be configured to receive signals directly from WTRU 110 in phase 1.

Still referring to FIG. 2, during phase 2 RS 115 may transmit to eNB 120. For the case that cooperation is not enabled, (e.g, simple forwarding, multicast forwarding), WTRU 110 does not transmit the data to the eNB 120 during phase 2. In this case, WTRU 110 may remain in idle mode and no power control may be needed for WTRU 110.

For the case that cooperation is enabled, (e.g., cooperative relaying, multicast cooperative relaying), WTRU 110 may send data to eNB 120 in phase 2, and thus WTRU 110 and RS 115 may employ distributed communication schemes, (e.g., spatial diversity schemes or spatial multiplexing), to improve the throughput at eNB 120. For example, the opportunistic cooperation configuration with PRS or multiple RSs may implement a loosely synchronized diversity transmission of the RS signal. Alternatively, the strong cooperation configuration may implement tightly synchronized distributed MIMO schemes, such as space-time diversity codes or distributed spatial multiplexing transmission schemes.

Figure 3A:
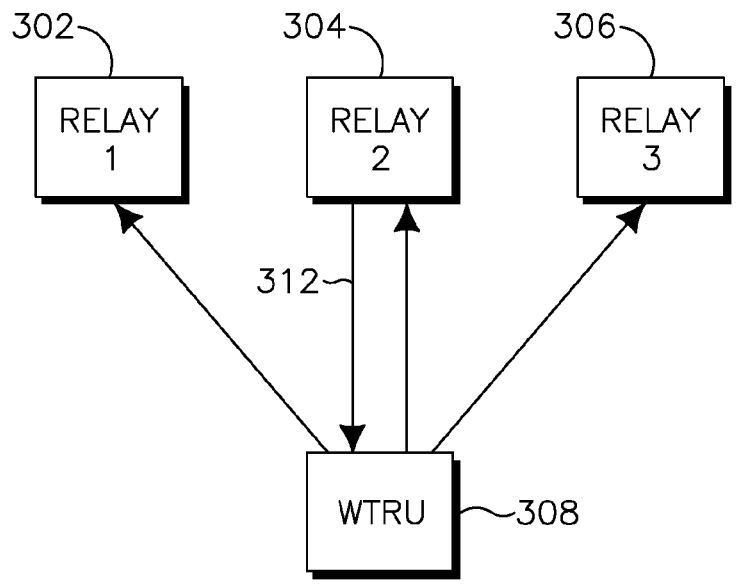
FIG. 3(a) is an example of a WTRU receiving a transmit power command (TPC) command from a RS.
Figure 3B:
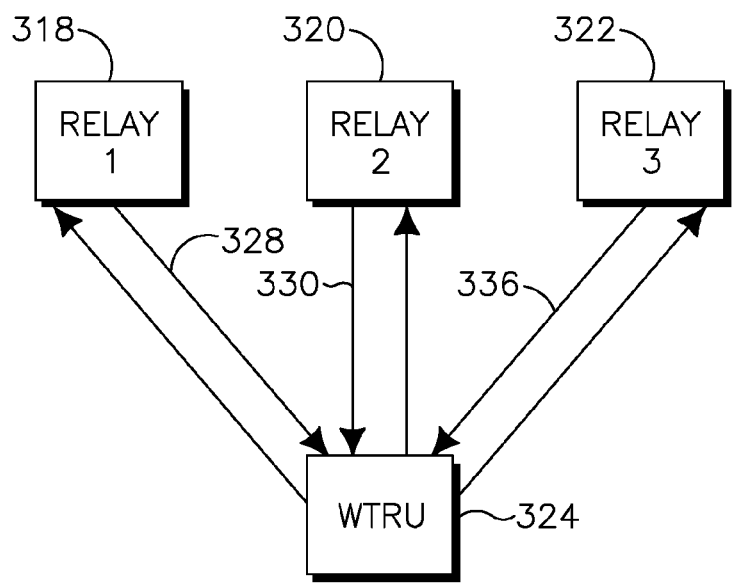
FIG. 3(b) is an example of a WTRU receiving multiple TPC commands from multiple RSs.

FIGS. 3(a) and 3(b) provide examples of uplink power control for the simple forwarding transmission configuration where the number of RSs N is 3. In the simple forwarding configuration, WTRU 110 is connected to N RSs, where N is larger or equal to one. FIG. 3(a) is an example with one RS TPC. FIG. 3(b) is an example with multiple RSs TPCs.

In FIG. 3(a), RS 304 may be the primary RS (PRS). Based on the downlink measurement between RS 304 and WTRU 308, WTRU 308 may be configured to compensate for the long-term variations and perform open loop power control for RSs 302, 304, and 306. WTRU 308 responds to TPC command 312 from RS 304 to adjust transmit power to perform closed loop power control.

Figure 4:
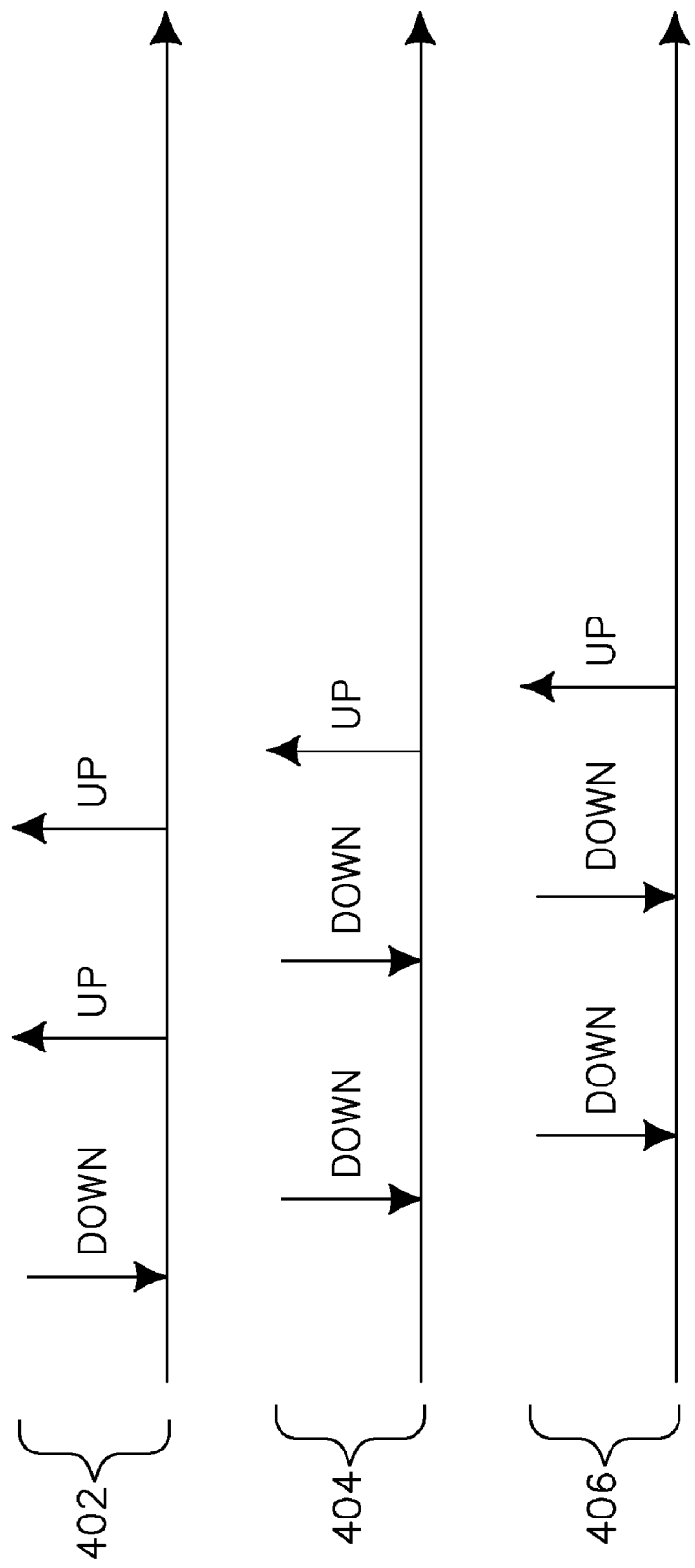
FIG. 4 is an example of a WTRU response to multiple TPC commands from N RSs.

FIG. 4 shows an example of a response to multiple TPC commands from N RSs, where N=2. In the case of multiple RSs TPCs shown in FIG. 3(b), the open loop power control of WTRU 324 may be configured to adjust the transmit power based on the multiple downlink information used by the WTRU 324 to calculate a "mixture" long-term loss that were sent from RSs 318, 320, and 322. For closed loop power control, WTRU 324 may be configured to adjust transmission power based on 330 and 336 commands sent from multiple controlling RSs 320 and 322 shown in 402 and 404, respectively. Commands 402 and 404 may be sent for each transmission time interval (TTI), as desired. Accordingly, WTRU 324 may be configured to derive a coordinated combined TPC command 406.

In order to minimize the inter-cell interference, WTRU 324 may be configured to increase the transmit power if all of RSs 318, 320, and 322 signal an up command. WTRU 324 may then transmit the minimum power desired by all RS 318, 320, and 322. WTRU 324 may also decrease the transmit power if any one of commands 328, 330, and 336 signals a DOWN command.

Figure 5A:
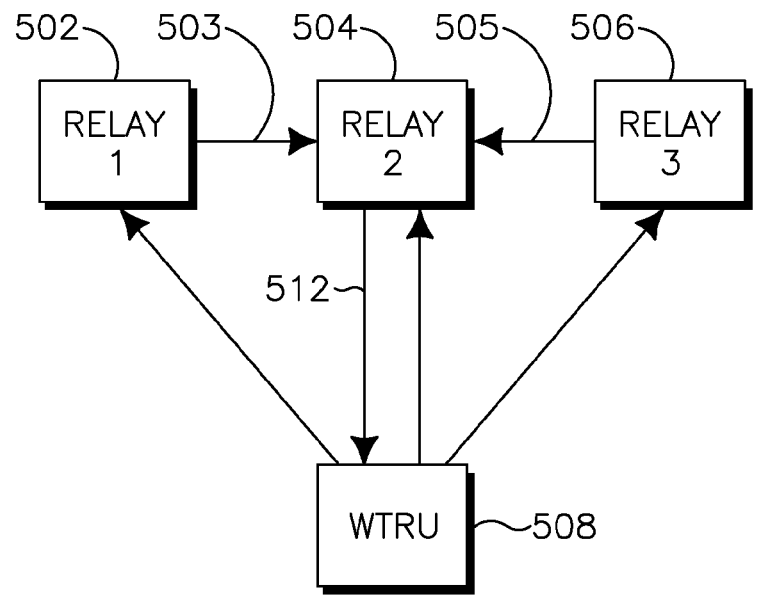
FIGS. 5(a) and 5(b) are examples of coordinated power control.

FIG. 5(a) shows an example of coordinated power control where multiple RSs 502, 504, and 506 may coordinate and send one or reduced number of power control commands in the downlink. In FIG. 5(a) although three RSs are shown the number of RSs may be any number greater than 1. One of RSs 502, 504, and 506 may be selected a-priori to be a master RS. For example, the selection may be performed as part of RS selection or RS reselection procedure. The selected RS may change in time, as WTRU 508 moves thereby changing the RSs that are visible or as the communication-state (e.g. load) of RSs changes in time. For the present example, RS 504 is the master RS.

Each RS 502, 504, and 506 may estimate a channel quality indicator (CQI) for each of the various WTRU 508 uplink channels. For example, WTRU 508 may be configured to transmit a reference signal, that RSs 502, 504, and 506 process to estimate the CQI for that channel. Alternately, the CQI may also be estimated using data driven algorithms, based on decision feedback techniques. The CQI measurements may be performed at regular time intervals.

RS 502 and 506 may be configured to report CQI measurements to Master RS 504 using inter-relay links. CQI measurement reports may include an RS-specific ID, and transmitted using a part of the eNB to RS to WTRU radio channels or using out-of-band signaling.

Master RS 504 may be configured to process the various CQI measurement reports 503 and 505, including its own measurement and determine the optimal power setting for WTRU 508. This may be converted into a transmit power control command 512 that is transmitted to WTRU 508 in the downlink. Master RS 504 may also be configured to take into account a relay-transmission-scheme (e.g. simple-forwarding or cooperative transmission scheme) and the quality of channels between RSs 502, 504, and 506 and an eNB. If eNB to RS CQIs are also considered, RSs 502 and 506 may be configured to transmit their corresponding eNB to RS CQIs also to Master RS 504, making use of inter-relay links.

Figure 5B:
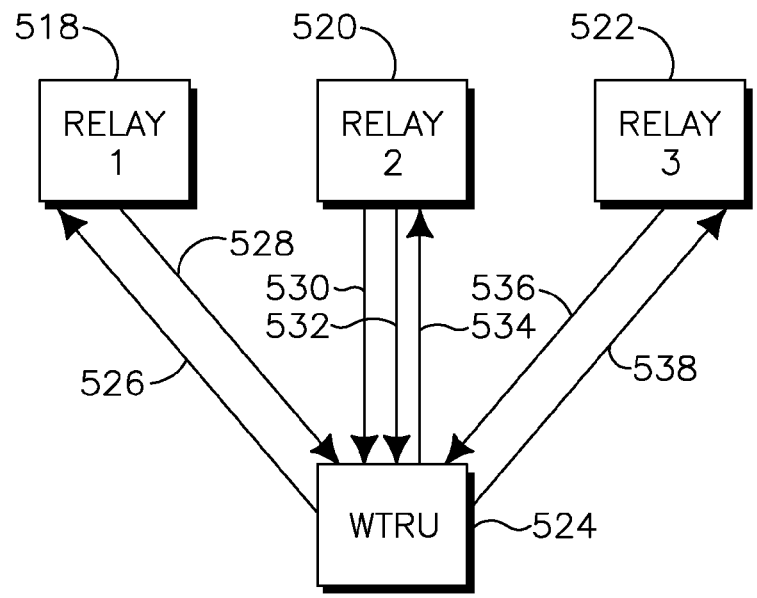

Alternatively, in FIG. 5(*b*) CQI estimated by RS 518, 520, and 522 may be reported to WTRU 524 using one of the downlink links 528, 532, and 536, respectively. WTRU broadcasts these CQI reports in its uplink transmissions 526, 534, and 538. The broadcast signal is received by all RSs 518, 520, and 522, including the Master RS 520, which determines TPC command 530.

If there are two relays involved, WTRU 524 may be configured to use a network coding approach, whereby the WTRU 524 sends a modulo-2 summation of CQI 532 and CQI 536. Master RS 520 receives this summation and modulo-2 subtracts CQI 536. This approach saves resources needed to transmit CQI data 526, 534, and 538.

In yet another alternative the control signals may be split between short and long term. The WTRU uses the short term information sent independently by RSs without fast coordination. The signals may be combined according to signals sent from BS based on slow information.

Multiple power control loops may be implemented in distributed MIMO schemes where a WTRU is configured to communicate with multiple RSs or eNBs, the RS and WTRU may cooperatively transmit to an eNB, or other similar configurations. A separate power control loop may be maintained for each distributed MIMO configuration. The separate power control loop refers to a WTRU that may be configured to compensate for the long-term variations between itself and a target RS or eNB and to respond to a power control feedback, such as a TPC command, provided by a RS or eNB when available.

When one-relay hop or a two-phase communication is considered, dual power control loops may be used. One power control loop may be associated with the phase in that RS 115 is receiving from WTRU 110 and the other power control loop may be associated with the phase in that RS 115 is transmitting and WTRU 110 is transmitting to the same destination.

Figure 6A:
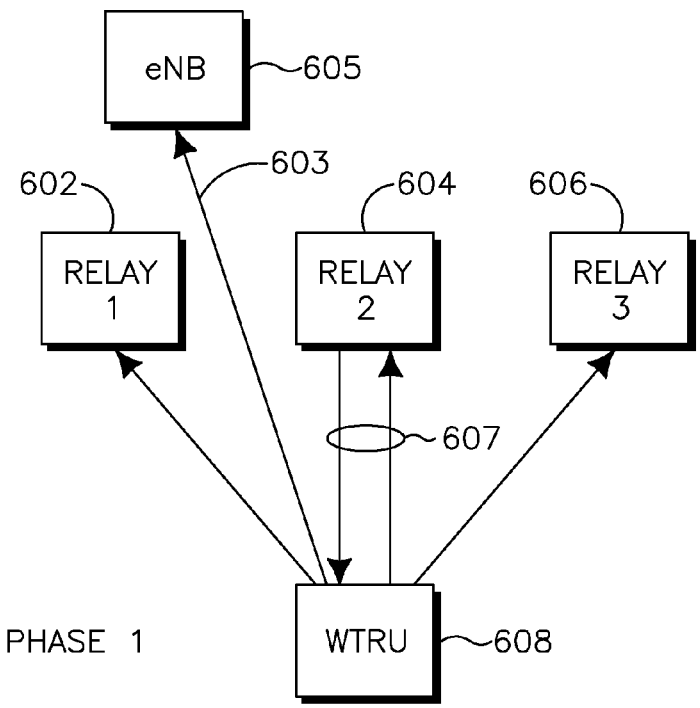
FIGS. 6(a) and 6(b) are examples of uplink power control for an opportunistic cooperation configuration in a two-phase power control system.
Figure 6B:
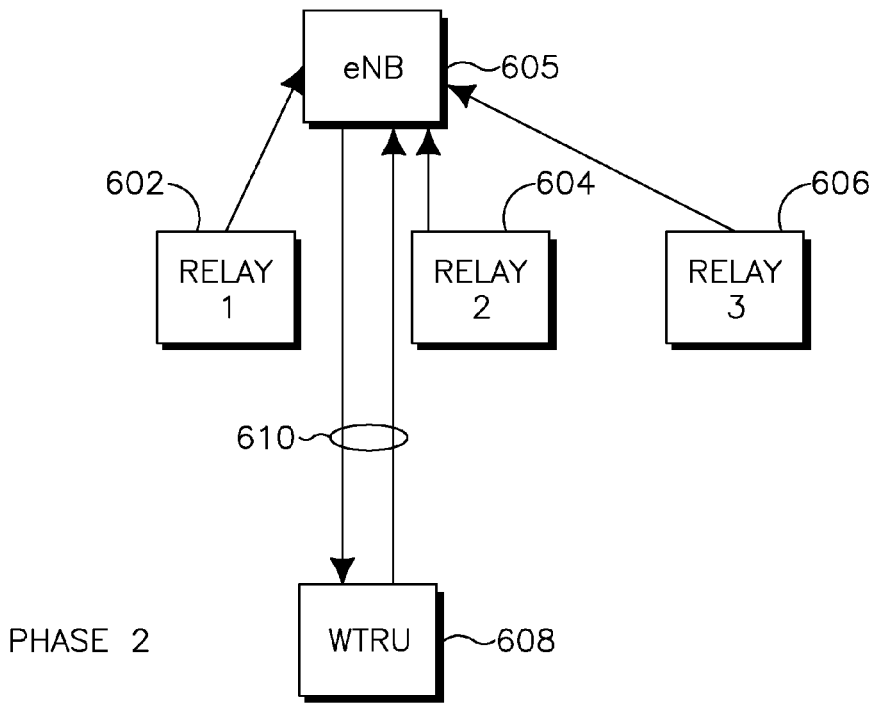

FIGS. 6(*a*) and 6(*b*) show an example of uplink power control for an opportunistic cooperation configuration in a two-phase communication when a primary RS 604 exists. In the opportunistic cooperation configuration WTRU 608 has sufficient connection quality with at least one RS 604 but link 603 to eNB 605 is insufficient to sustain a direct communication. eNB 605 may opportunistically receive data via link 603 from WTRU 608 when RSs 602, 604, and 606 are receiving. In phase 1 shown in FIG. 6(*a*), power control loop 607 is provided between WTRU 608 and primary RS 604. In phase 2 shown in FIG. 6(*b*), power control loop 610 is provided between WTRU 608 and eNB 605.

Figure 7A:
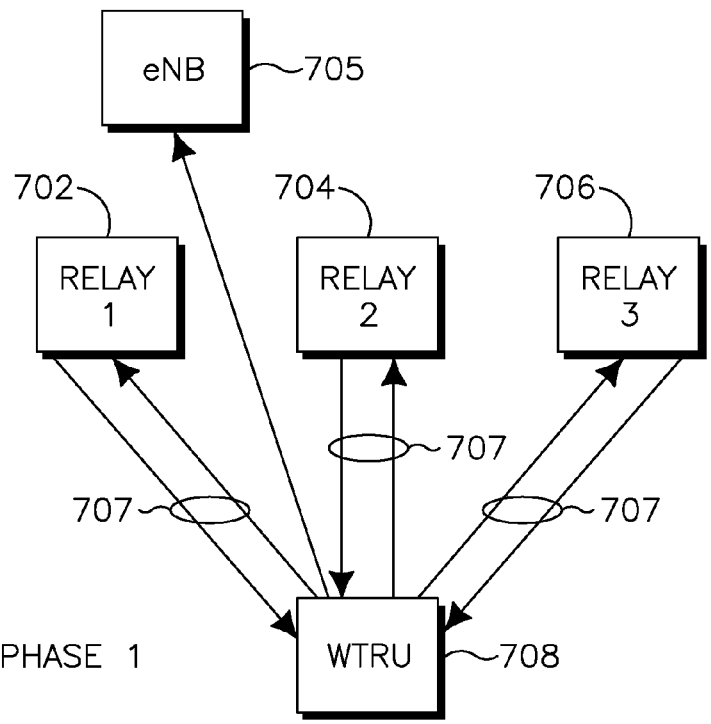
FIGS. 7(a) and 7(b) are examples of uplink power control for an opportunistic cooperation configuration in a two-phase power control system.
Figure 7B:
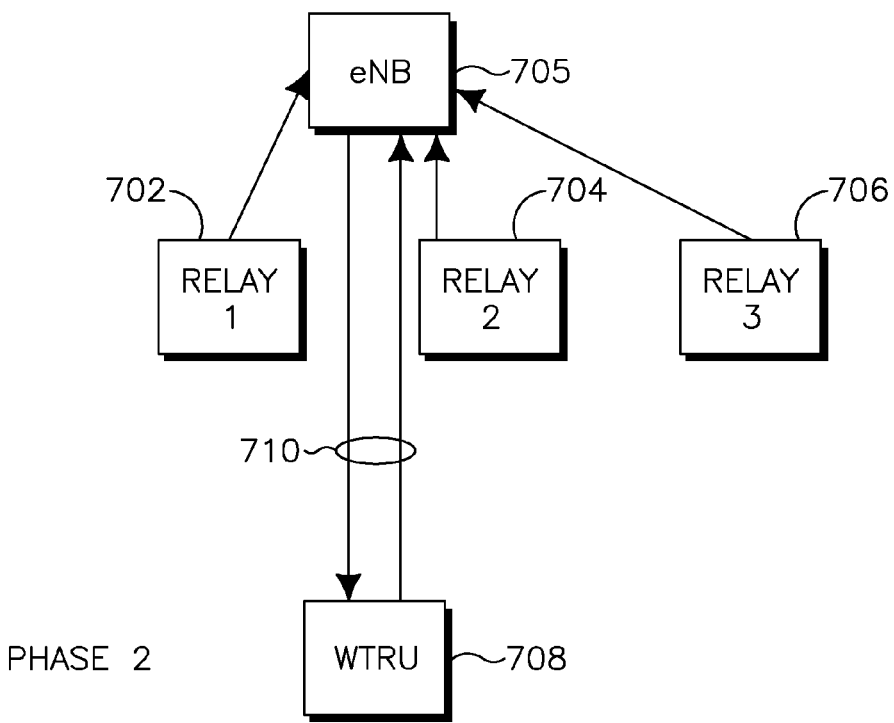

FIGS. 7(*a*) and 7(*b*) show an example of uplink power control for the opportunistic cooperation configuration with a relaying assistant communication when multiple equally good RSs exist. In phase 1 shown in 7(*a*), power control loops 707 are provided between WTRU 708 and RSs 702, 704, and 706. In phase 2, power control loop 710 is provided between WTRU 708 and eNB 705.

Assuming that one relay hop is considered, the power control loop in phase 1 is similar to the one shown in FIGS. 3(*a*) and 3(*b*). In phase 2, the transmission target of WTRU 608 or 708 may change from one or more RSs to eNB 605 or 705, respectively. The initial power setting of the WTRU in each phase may depend on the transmission target for the different phases. The changing of initial power settings in different phases may be based on the existing signaling, such as an ACK from a RS or extra signaling provided by the primary RS or higher layer.

The opportunistic cooperation configuration in FIGS. 6(*a*), 6(*b*), 7(*a*), and 7(*b*) may allow for simple control and reduced signaling overhead from eNBs 605 and 705. However, it may also provide reduced potential multicast benefit if multicast option is used, that is if the eNB 605 and 705 opportunistically receives phase 1 transmissions from WTRUs 608 and 708, respectively.

Figure 8A:
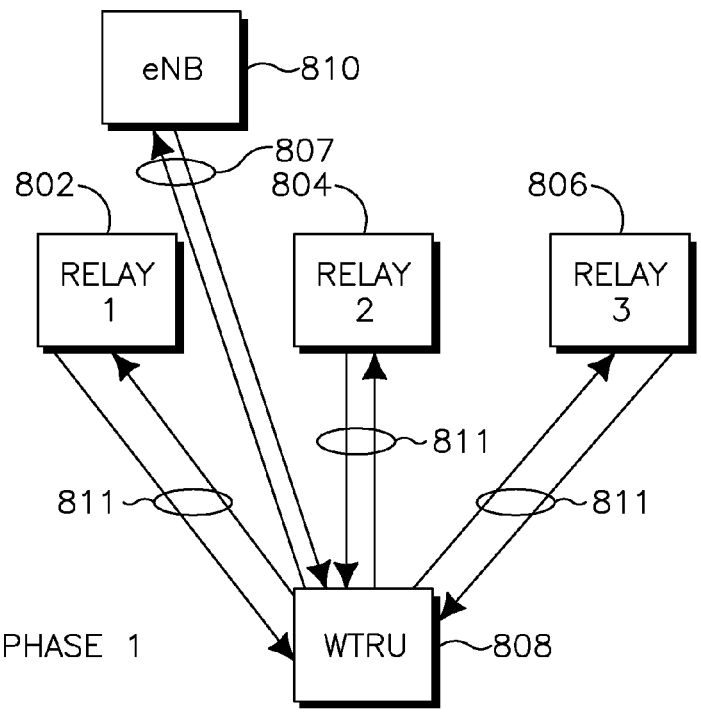
FIGS. 8(a) and 8(b) shows an example of power control for a strong cooperation configuration in a two-phase power control system.
Figure 8B:
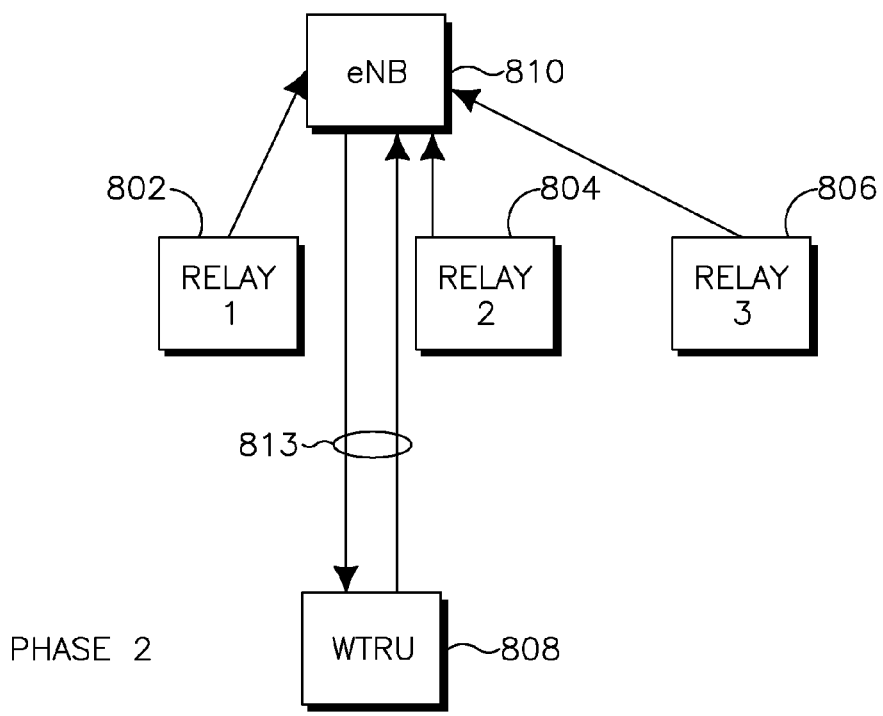

FIGS. 8(*a*) and 8(*b*) show an example of uplink power control for a strong cooperation configuration in a two-phase communication when multiple equally good RSs exist. In the strong cooperation configuration the direct link between the WTRU 808 and eNB 810 is reasonable although insufficient to sustain direct communication. WTRU 808 communicates with the eNB 810 using parallel communication paths, namely the direct WTRU to eNB path as well as a WTRU to RS to eNB path via the RSs.

In phase 1 shown in FIG. 8(*a*), power control loops 807 and 811 are provided between WTRU 808 to eNB 810 and RSs 802, 804, and 806. In phase 2 shown in FIG. 8(*b*), power control loop 813 is provided between WTRU 808 and eNB 810.

Open loop power control in phase 1 of WTRU 808 may be configured to calculate a mixture value to compensate for the long-term channel variations between itself and eNB 810 or RSs 802, 804, and 806. This mixture, for example, may be a combined value of downlink pathloss and shadowing estimates.

For closed loop power control, joint RS and eNB TPC reception may be enabled in phase 1 as shown in FIG. 8(*c*). WTRU 808 may derive a combined TPC command 816 based on the multiple power control TPC commands issued by multiple RSs via power control loops 811 shown in 814 and the TPC command issued by the eNB via power control loop 807 shown in 812. Commands 812 and 814 may be sent for each transmission time interval (TTI), as desired. Alternatively, WTRU 808 may be configured to increase transmit power if both RSs 802, 804, and 806 and eNB 810 signal an UP command. WTRU 808 may transmit the minimum power desired by the RSs and eNB. WTRU 808 may be further configured to decrease transmit power if either RSs 802, 804, and 806 or eNB 810 signal a DOWN command.

In phase 2, the transmission of WTRU 808 may be changed to eNB 810. WTRU 808 may then be configured to compensate for the long-term channel loss between eNB 810 and WTRU 808. For closed loop power control, WTRU 808 may be configured to respond to eNB 810 TPCs via power control loop 813 to adjust transmit power.

As discussed, different from multiple power control loops another option comprises the use of one power control loop among different phases for WTRU 110 power adjustment. Having one power control loop may not mean that the transmit power is maintained among different phases. One power loop refers to a single controlling node to control the transmit power of WTRU 110. For example, in a two-phase transmission, the transmit power difference between phase 1 and phase 2 may be pre-determined, which may be signaled by the eNB 120 or provided by higher layer signaling. In phase 1, WTRU 110 may be configured to set up the transmit power based on the pathloss estimate between RS 115 and itself. If WTRU 110 transmits in phase 2, the power offset between phase 1 and phase 2 may be signaled by eNB 120 or provided higher layer such as by a radio resource control (RRC) communication.

In another embodiment, it is desirable to transmit uplink packets at the highest possible rate for applications such as higher quality video conferencing, photo uploads, or the like. By employing higher transmit power, a link may be established with a higher modulation and coding scheme (MCS) thereby allowing a higher throughput. While WTRU 110 and RS 115 transmit power is higher, the packets require less time to transmit reducing the power penalty for such an operation.

For either WTRUs in phase 1 or RSs in phase 2, WTRU 110 may be configured to increase transmit power if any controlling RSs 115 signal an UP command. WTRU 110 may transmit the minimum power desired by all RSs 115. WTRU 110 may further be configured to decrease transmit power if all the RSs 115 signal a DOWN command. All connected RSs 115 may then increase their transmit power if they receive an UP command from eNB 120. All connected RSs 115 may decrease their transmit power if they receive a DOWN command from eNB 120.

Increased transmit power from the WTRUs or RSs may increase the amount of intra-cell or inter-cell interference for CDMA and HSPA based networks. However, intra-cell interference is negligible due to the orthogonal nature of OFDM communications and assuming that RSs within a cell are time synchronized. Inter-cell interference may be problematic for all types of networks.

For networks with centralized scheduling, there exists an opportunity to reduce inter-cell interference through the use of dynamic channel allocation (DCA). In order to reduce inter-cell interference, WTRUs or RSs from adjacent cells should not use the same subcarriers. Subcarriers may be allocated according a variety of well known DCA algorithms. Fractional frequency reuse may also be employed. Therefore, the DCA is applied to the "outer ring" or cell edge region of a cell. This may allow for coordination to reduce inter-cell-interference and improve cell-edge performance.

Alternatively, neighboring cells may communicate, such as through X2 signaling in LTE, to identify which resource blocks (RBs) are assigned to the WTRUs with high power such that collisions may be avoided. Alternatively, a predetermined number of RBs may be selected and assigned to a high power WTRU. Once the RBs are loaded, no other neighboring WTRUs may be assigned to these RBs.

FIG. 9 shows an example of a MIMO network having a flat topology. Each eNB 902 and 904 may be configured to forward power control commands 908 and 914 and system information directly to WTRU 906. WTRU 906 may then integrate the commands and system information using any of the methods discussed above.

Figure 10:
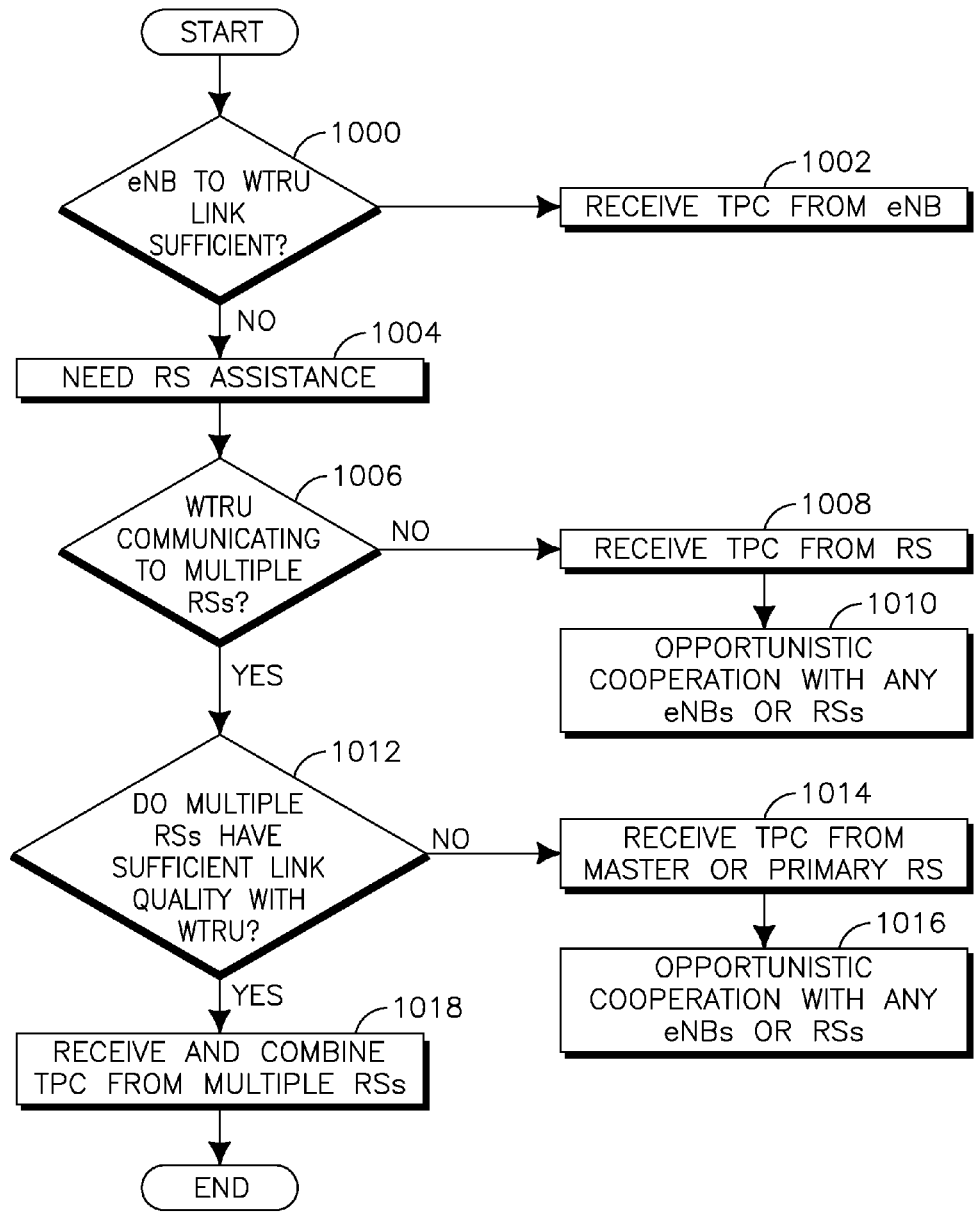
FIG. 10 is a flow diagram of a process in accordance with the present description.

FIG. 10 is a flow diagram of a process in accordance with the present description. If an eNB to WTRU link is sufficient (1000), the WTRU is configured to receive TPC commands from the eNB (1002). Otherwise, RS assistance may be needed (1004). The WTRU may then be configured to communicate with multiple RSs (1006) such as in a distributed communication system. If the WTRU communicates with one RS, a TPC command may be received from one RS (1008) and the WTRU may be configured for opportunistic cooperation, as previously described, with any eNBs or RSs (1010) such as in a distributed communication system. If the WTRU has sufficient link quality with multiple RSs (1012), the WTRU may be configured to receive and combine TPC commands from multiple RSs (1018). Otherwise, the WTRU may receive a TPC command from a master or primary RS (1014) and the WTRU may be configured for opportunistic cooperation with any eNBs or RSs (1016) such as in a distributed communication system.

Figure 11:
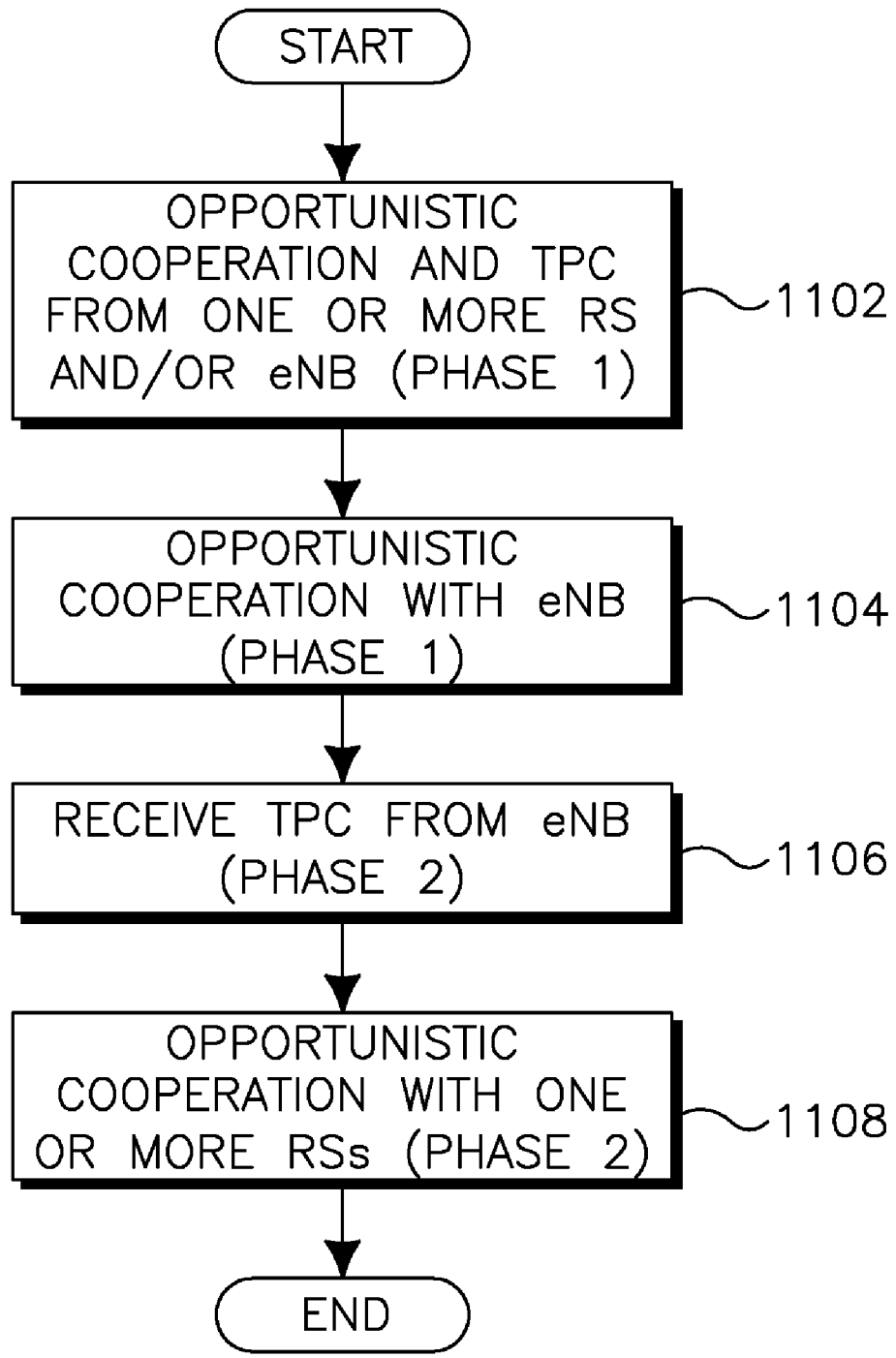
FIG. 11 is a flow diagram of another process in accordance with the present description.

FIG. 11 is a flow diagram of another process in accordance with the present description. A WTRU may be configured for opportunistic cooperation, as previously described, with one or more RSs and receive TPC commands from one or more RSs or eNBs in phase 1 (1102). The WTRU may also be configured for opportunistic cooperation with an eNB in phase 1 (1104). The WTRU may be configured to receive a TPC command from an eNB in phase 2 (1106). The WTRU may configured for opportunistic cooperation with one or more RSs in phase 2 (1108).

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

What is claimed is:

1. A method for power control in a wireless transmit/receive unit (WTRU) configured for distributed communications, the method comprising:
    communicating concurrently by the WTRU with a plurality of base stations and a plurality of relay stations (RSs);
    maintaining at least two closed loop independent power control loops by the WTRU with the base stations and the RSs;
    receiving different transmit power control (TPC) commands by the WTRU from each of the closed loop independent power control loops during at least two time intervals;
    deriving by the WTRU a combined TPC command based on the different TPC commands; and
    determining by the WTRU a transmit power increase or decrease based on the combined TPC command.

2. The method of claim 1 further comprising determining a primary RS from the RSs, and receiving by the WTRU a primary TPC command from the primary RS while communicating concurrently with the RSs.

3. The method of claim 2 wherein the primary TPC command is a coordinated combined TPC command.

4. The method of claim 1 further comprising transmitting by the WTRU the received different TPC commands to the RSs.

5. The method of claim 1 wherein the distributed communications is configured for multi-user multiple in/multiple out (MIMO) communications.

6. The method of claim 1 wherein the distributed communications is configured for Long Term Evolution (LTE), 802.16, High Speed Packet Access (HSPA), or code division multiple access (CDMA) communications.

7. The method of claim 1 further comprising computing a path loss by the WTRU for open loop power control based on a proportion of power needed by the base stations and the RSs and path loss estimates between the WTRU and the base stations and the RSs.

8. The method of claim 1 further comprising communicating concurrently by the WTRU with the base stations and the RSs with parallel communication paths.

9. A wireless transmit/receive unit (WTRU) configured for distributed communications, the WTRU comprising:
   a plurality of transceivers configured to communicate concurrently with a plurality of two or more base stations and a plurality of relay stations (RSs);
   the transceivers configured to maintain at least two closed loop independent power control loops with the base stations and the RSs;
   the transceivers configured to receive different transmit power control (TPC) commands from each of the closed loop independent power control loops during at least two time intervals; and
   a processor configured to derive a combined TPC command based on the different TPC commands and determine a transmit power increase or decrease based on the combined TPC command.

10. The WTRU of claim 9 further configured to determine a primary RS from the RSs, and the one or more transceivers configured to receive a primary TPC command from the primary RS while communicating concurrently with the one or more RSs.

11. The WTRU of claim 10 wherein the primary TPC command is a coordinated combined TPC command.

12. The WTRU of claim 9 wherein the transceivers are configured to transmit the received different TPC commands to the RSs.

13. The WTRU of claim 9 wherein the distributed communications is configured for multi-user multiple in/multiple out (MIMO) communications.

14. The WTRU of claim 9 wherein the distributed communications is configured for Long Term Evolution (LTE), 802.16, High Speed Packet Access (HSPA), or code division multiple access (CDMA) communications.

15. The WTRU of claim 9 further configured to compute a path loss for open loop power control based on a proportion of power needed by the base stations and the RSs and path loss estimates between the WTRU and the base stations and the RSs.

16. The WTRU of claim 9 further configured to communicate concurrently with the base stations and the RSs with parallel communication paths.

* * * * *